US008954323B2

(12) United States Patent
Tsujikawa et al.

(10) Patent No.: US 8,954,323 B2
(45) Date of Patent: Feb. 10, 2015

(54) METHOD FOR PROCESSING MULTICHANNEL ACOUSTIC SIGNAL, SYSTEM THEREOF, AND PROGRAM

(75) Inventors: Masanori Tsujikawa, Tokyo (JP); Tadashi Emori, Tokyo (JP); Yoshifumi Onishi, Tokyo (JP); Ryosuke Isotani, Tokyo (JP)

(73) Assignee: NEC Corporation, Tokyo (JP)

( * ) Notice: Subject to any disclaimer, the term of this patent is extended or adjusted under 35 U.S.C. 154(b) by 197 days.

(21) Appl. No.: 13/201,389

(22) PCT Filed: Feb. 8, 2010

(86) PCT No.: PCT/JP2010/051750
§ 371 (c)(1), (2), (4) Date: Oct. 5, 2011

(87) PCT Pub. No.: WO2010/092913
PCT Pub. Date: Aug. 19, 2010

(65) Prior Publication Data
US 2012/0046940 A1 Feb. 23, 2012

(30) Foreign Application Priority Data
Feb. 13, 2009 (JP) ................................ 2009-031109

(51) Int. Cl.
*G10L 21/02* (2013.01)
*G10L 15/20* (2006.01)
*G10L 21/0272* (2013.01)

(52) U.S. Cl.
CPC .................................. *G10L 21/0272* (2013.01)
USPC .......................................... 704/226; 704/233

(58) Field of Classification Search
USPC ............ 704/200, 226, 216, 217, 218; 381/17; 700/94
See application file for complete search history.

(56) References Cited

U.S. PATENT DOCUMENTS

| | | | | |
|---|---|---|---|---|
| 7,403,609 | B2 * | 7/2008 | Hirai et al. | 379/406.01 |
| 7,664,643 | B2 * | 2/2010 | Gopinath et al. | 704/256 |

(Continued)

FOREIGN PATENT DOCUMENTS

| | | | |
|---|---|---|---|
| JP | 2005-308771 A | 11/2005 | |
| JP | 2006-5100869 A | 3/2006 | |

(Continued)

OTHER PUBLICATIONS

Wrigley, Brown, Wan and Renals, Speech and Crosstalk Detection in Multichannel Audio, IEEE Transactions on Speech and Audio Processing, pp. 84-91, vol. 13, No. 1, Jan. 2005.*

(Continued)

*Primary Examiner* — Brian Albertalli
(74) *Attorney, Agent, or Firm* — Sughrue Mion, PLLC

(57) ABSTRACT

A method for processing multichannel acoustic signals, whereby input signals of a plurality of channels including the voices of a plurality of speaking persons are processed. The method is characterized by comprising: calculating the first feature quantity of the input signals of the multichannels for each channel; calculating similarity of the first feature quantity of each channel between the channels; selecting channels having high similarity; separating signals using the input signals of the selected channels; inputting the input signals of the channels having low similarity and the signals after the signal separation; and detecting a voice section of each speaking person or each channel.

33 Claims, 9 Drawing Sheets

(56) References Cited

U.S. PATENT DOCUMENTS

| | | | | |
|---|---|---|---|---|
| 2003/0061185 | A1* | 3/2003 | Lee et al. | 706/20 |
| 2003/0120485 | A1* | 6/2003 | Murase et al. | 704/228 |
| 2005/0060142 | A1 | 3/2005 | Visser et al. | |
| 2006/0058983 | A1 | 3/2006 | Araki et al. | |
| 2007/0021958 | A1* | 1/2007 | Visser et al. | 704/226 |
| 2007/0135952 | A1* | 6/2007 | Chubarev | 700/94 |
| 2008/0052074 | A1* | 2/2008 | Gopinath et al. | 704/256 |
| 2008/0215651 | A1* | 9/2008 | Sawada et al. | 708/205 |
| 2008/0228470 | A1* | 9/2008 | Hiroe | 704/200 |
| 2008/0262834 | A1* | 10/2008 | Obata et al. | 704/200 |
| 2009/0048824 | A1* | 2/2009 | Amada | 704/10 |
| 2009/0164212 | A1* | 6/2009 | Chan et al. | 704/226 |
| 2010/0092007 | A1* | 4/2010 | Sun | 381/92 |
| 2010/0142327 | A1* | 6/2010 | Kepesi et al. | 367/124 |
| 2010/0232621 | A1* | 9/2010 | Aichner et al. | 381/94.1 |
| 2012/0197637 | A1* | 8/2012 | Gratke et al. | 704/226 |

FOREIGN PATENT DOCUMENTS

| | | | |
|---|---|---|---|
| JP | 2008-0892363 | A | 4/2008 |
| WO | 2005/024788 | A1 | 3/2005 |

OTHER PUBLICATIONS

Pfau, Ellis, and Stolcke, Multispeaker Speech Activity Detection for the ICSI Meeting Recorder, Proceedings IEEE Automatic Speech Recognition and Understanding Workshop, Madonna di Campiglio, 2001.*

Jin, Laskowski, Schultz, and Waibel, Speaker Segmentation and Clustering in Meetings, Proceedings of the 8th International Conference on Spoken Language Processing, Jeju Island, Korea, 2004.*

Huang and Yang, A New Approach of LPC Analysis Based on the Normalization of Vocal-Tract Length, 9th International Conference on Pattern Recognition, pp. 634-636, Nov. 1988.*

Wolfel, Channel Selection by Class Separability Measures for Automatic Transcriptions on Distant Microphones, Interspeech 2007, Aug. 27-31, Antwerp, Belgium.*

Obuchi, Yasunari. "Multiple-microphone robust speech recognition using decoder-based channel selection." ISCA Tutorial and Research Workshop (ITRW) on Statistical and Perceptual Audio Processing. 2004.*

Wölfel, Matthias, et al. "Multi-source far-distance microphone selection and combination for automatic transcription of lectures." Interspeech. 2006.*

Anguera, Xavier, Chuck Wooters, and Javier Hernando. "Acoustic beamforming for speaker diarization of meetings." Audio, Speech, and Language Processing, IEEE Transactions on 15.7 (2007): 2011-2022.*

Aarabi, Parham, and Sam Mavandadi. "Robust speech separation using two-stage independent component analysis." Information Fusion, 2003. Proceedings of the Sixth International Conference of. vol. 2. IEEE, 2003.*

Asano, Futoshi, et al. "Combined approach of array processing and independent component analysis for blind separation of acoustic signals." Speech and Audio Processing, IEEE Transactions on 11.3 (2003): 204-215.*

Winter, Stefan, Hiroshi Sawada, and Shoji Makino. "Geometrical understanding of the PCA subspace method for overdetermined blind source separation." Acoustics, Speech, and Signal Processing, 2003. Proceedings.(ICASSP'03). 2003 IEEE International Conference on. vol. 2. IEEE, 2003.*

* cited by examiner

METHOD FOR PROCESSING MULTICHANNEL ACOUSTIC SIGNAL, SYSTEM THEREOF, AND PROGRAM

CROSS REFERENCE TO RELATED APPLICATIONS

This application is a National Stage of International Application No. PCT/JP2010/051750 filed Feb. 8, 2010, claiming priority based on Japanese Patent Application No. 2009-031109 filed Feb. 13, 2009, the contents of all of which are incorporated herein by reference in their entirety.

TECHNICAL FIELD

The present invention relates to a multichannel acoustic signal processing method, a system therefor, and a program.

BACKGROUND ART

One example of the related multichannel acoustic signal processing system is described in Patent literature 1. This system is a system for extracting objective voices by removing out-of-object voices and background noise from mixed acoustic signals of voices and noise of a plurality of talkers observed by a plurality of microphones arbitrarily arranged. Further, the above system is a system capable of detecting the objective voices from the above-mentioned mixed acoustic signals.

FIG. 10 is a block diagram illustrating a configuration of the noise removal system disclosed in the Patent literature 1, and a configuration and an operation of a point of detecting the objective voices from the mixed acoustic signals will be explained schematically. The system includes a signal separator 101 that receives and separates input time series signals of a plurality of channels, a noise estimator 102 that receives the separated signals to be outputted from the signal separator 101, and estimates the noise based upon an intensity ratio coming from an intensity ratio calculator 106, and a noise section detector 103 that receives the separated signals to be outputted from the signal separator 101, noise components estimated by the noise estimator 102, and an output of the intensity ratio calculator 106, and detects a noise section and a voice section.

CITATION LIST

Patent Literature

PTL 1: JP-P2005-308771A

SUMMARY OF INVENTION

Technical Problem

While the noise removal system described in the Patent literature 1 explained above aims for detecting and extracting the objective voices from the mixed acoustic signals of voices and noise of a plurality of the talkers observed by a plurality of the microphones arbitrarily arranged, it includes the following problem.

The above problem is that the objective voices cannot be efficiently detected and extracted from the mixed acoustic signals in some cases. The reason thereof is that the signal separation is required in some cases and is not required in some cases, dependent upon microphone signals when it is supposed that a plurality of the microphones are arbitrarily arranged, and for example, the objective voices are detected by employing the signals coming from a plurality of the microphones (microphone signals, namely, input time series signals in FIG. 10). That is, a degree in which the signal separation is necessitated differs dependent upon the processing of a rear stage of the signal separator 101. When a large number of the microphone signals of which the signal separation is not required exist, the signal separator 101 results in expending an enormous calculation amount for the unnecessary processing, and it is non-efficient.

Further, another reason is that the system of the Patent Literature 1 has a configuration of detecting the noise section and the voice section by employing an output of the signal separator 101 for extracting the objective voices. For example, now think about the case of supposing an arrangement of talkers A and B, and microphones A and B as shown in FIG. 1, and detecting and extracting the voices of the talkers A and B from the mixed acoustic signals of the talker A and B collected by the microphones A and B, respectively. The voice of the talker A and that of the talker B mixedly enter the microphone A at an approximately identical ratio because a distance between the microphone A and the talker A is close to a distance between the microphone A and the talker B (see FIG. 2).

However, the voice of the talker A mixedly entering the microphone B is few as compared with the voice of the talker B entering the microphone B because a distance between the microphone B and the talker A is far away as compared with a distance between the microphone B and the talker B (see FIG. 2). That is, in order to extract the voice of the talker A included in the microphone A and the voice of the talker B included in the microphone B, a necessity degree for removing the voice of the talker B mixedly entering the microphone A (crosstalk by the talker B) is high. However, a necessity degree for removing the voice of the talker A mixedly entering the microphone B (crosstalk due to the talker A) is low. When the necessity degree of the removal differs, it is non-efficient for the signal separator 101 to perform the identical processing for the mixed acoustic signals collected by the microphone A and the mixed acoustic signals collected by the microphone B.

Thereupon, the present invention has been accomplished in consideration of the above-mentioned problems, and an object thereof lies in providing a multichannel acoustic signal processing system capable of efficiently detecting the objective voices from the input signals of the multichannel.

Solution to Problem

The present invention for solving the above-mentioned problems is a multichannel acoustic signal processing method of processing input signals of a plurality of channels including voices of a plurality of talkers, comprising: calculating a first feature for each channel from the input signals of a multichannel; calculating an inter-channel similarity of said by-channel first feature; selecting a plurality of the channels of which said similarity is high; separating the signals by employing the input signals of a plurality of the selected channels; and detecting said by-talker voice section or said by-channel voice section with the input signals of a plurality of the channels of which said similarity is low and the signals subjected to said signal separation taken as an input, respectively.

The present invention for solving the above-mentioned problems is a multichannel acoustic signal processing system for processing input signals of a plurality of channels including voices of a plurality of talkers, comprising: a first feature calculator that calculates a first feature for each channel from the input signals of a multichannel; a similarity calculator that calculates an inter-channel similarity of said by-channel first feature; a channel selector that selects a plurality of the channels of which said similarity is high; a signal separator that separates the signals by employing the input signals of a plurality of the selected channels; and a voice detector that detects said by-talker voice section or said by-channel voice section with the input signals of a plurality of the channels of which said similarity is low and the signals subjected to said signal separation taken as an input, respectively.

The present invention for solving the above-mentioned problems is a program for processing input signals of a plurality of channels including voices of a plurality of talkers, said program causing an information processing device to execute: a first feature calculating process of calculating a first feature for each channel from the input signals of a multichannel; a similarity calculating process of calculating an inter-channel similarity of said by-channel first feature; a channel selecting process of selecting a plurality of the channels of which said similarity is high; a signal separating process of separating the signals by employing the input signals of a plurality of the selected channels; and a voice detecting process of detecting said by-talker voice section or said by-channel voice section with the input signals of a plurality of the channels of which said similarity is low and the signals subjected to said signal separation taken as an input, respectively.

Advantageous Effect of Invention

The present invention makes it possible to omit the unnecessary calculation, and to efficiently detect the objective voices.

DESCRIPTION OF EMBODIMENTS

First Exemplary Embodiment

The first exemplary embodiment of the present invention will be explained.

Figure 1:
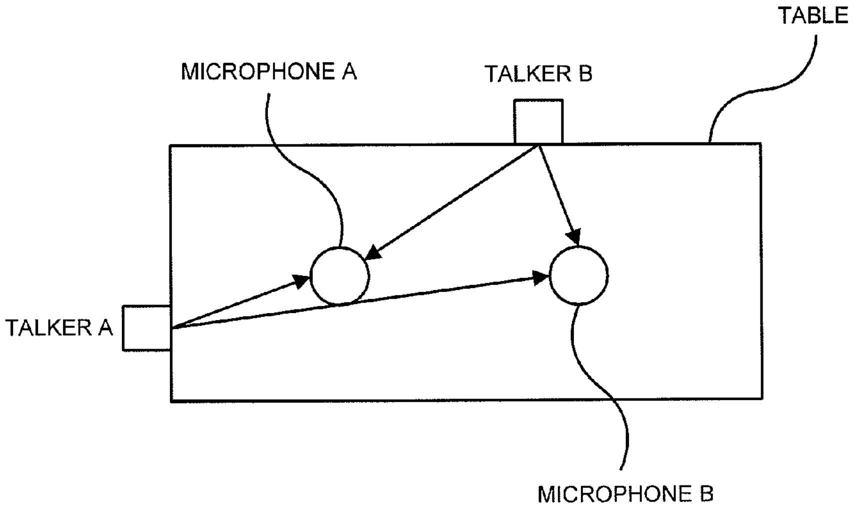
FIG. 1 is an arrangement view of the microphones and the talkers for explaining an object of the present invention.
Figure 2:
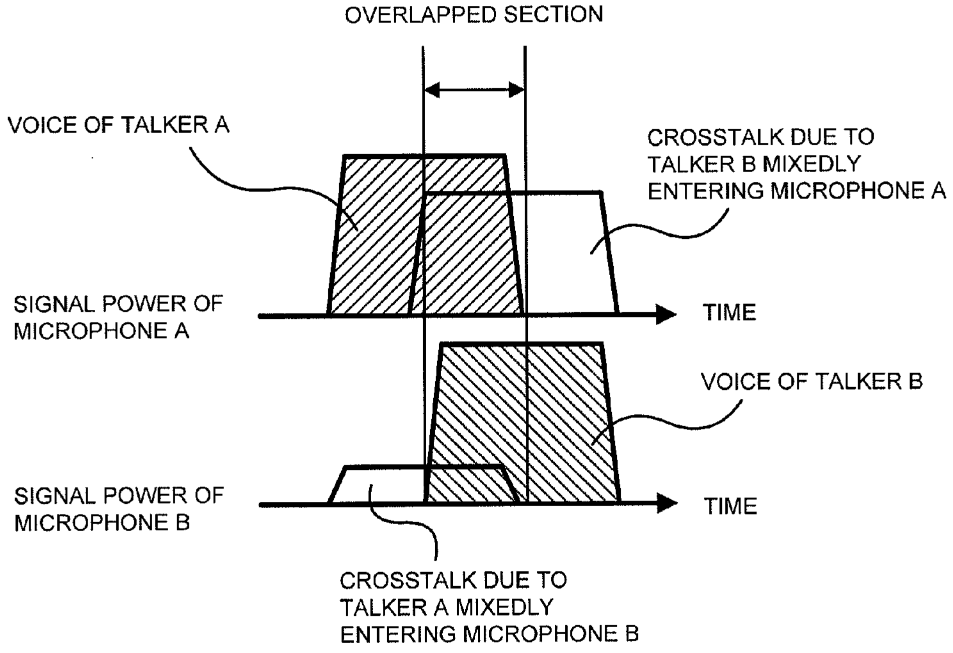
FIG. 2 is a view for explaining the crosstalk and an overlapped section.
Figure 3:
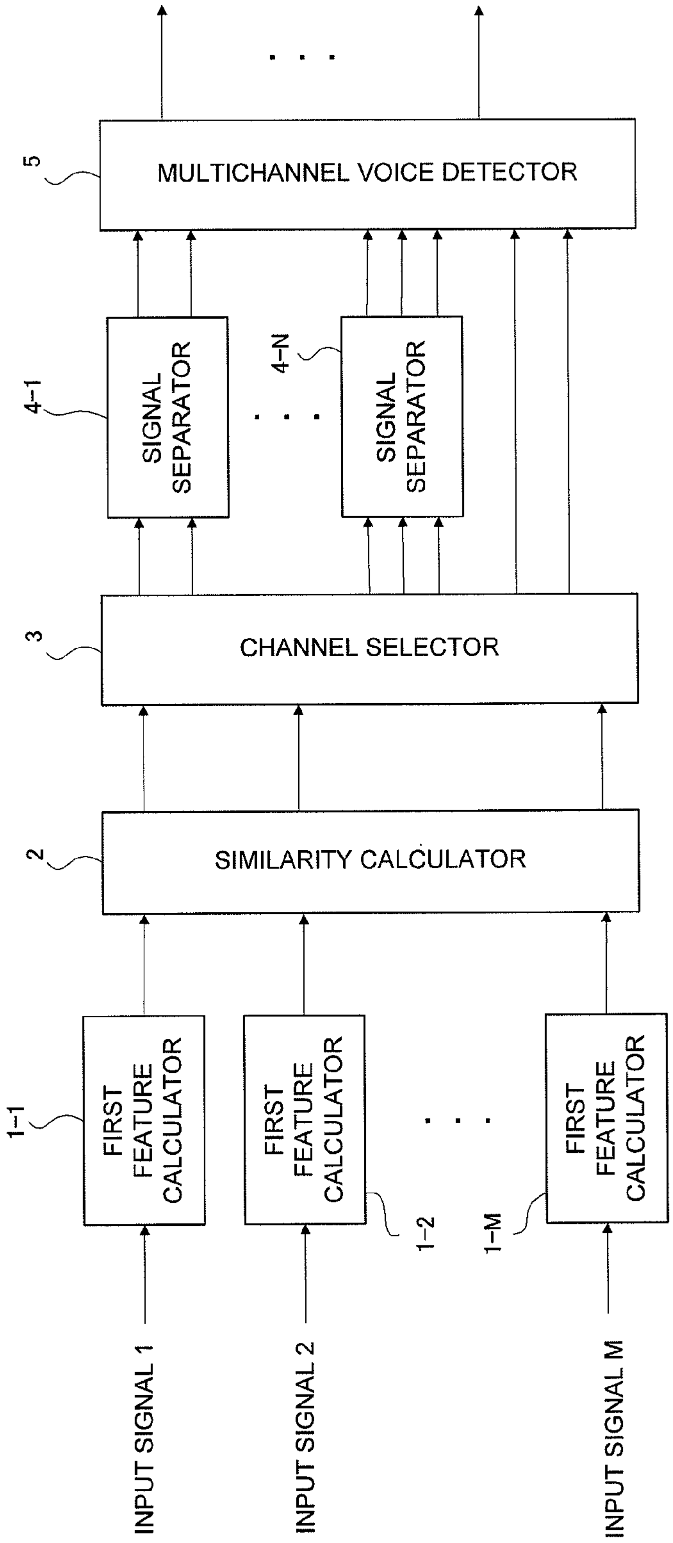
FIG. 3 is a block diagram illustrating a configuration of a first exemplary embodiment of the present invention.

FIG. 3 is a block diagram illustrating a configuration example of the multichannel acoustic signal processing system of the first exemplary embodiment. The multichannel acoustic signal processing system shown in FIG. 3 includes first feature calculators 1-1 to 1-M that receive input signals 1 to M and calculate a by-channel first feature, respectively, a similarity calculator 2 that receives the first features and calculates an inter-channel similarity, a channel selector 3 that receives the inter-channel similarity and selects the channels of which the similarity is high, signal separators 4-1 to 4-N that receive input signals of the selected channels of which the similarity is high and separate the signals, and a multichannel voice detector 5 that receives the signals subjected to the signal separation coming from the signal separators 4-1 to 4-N, and the input signals of the channels which the similarity is low as the input signals, and detects the voices of a plurality of the talkers in these input signals of a plurality of the channels with anyone of the channels, respectively.

Figure 4:
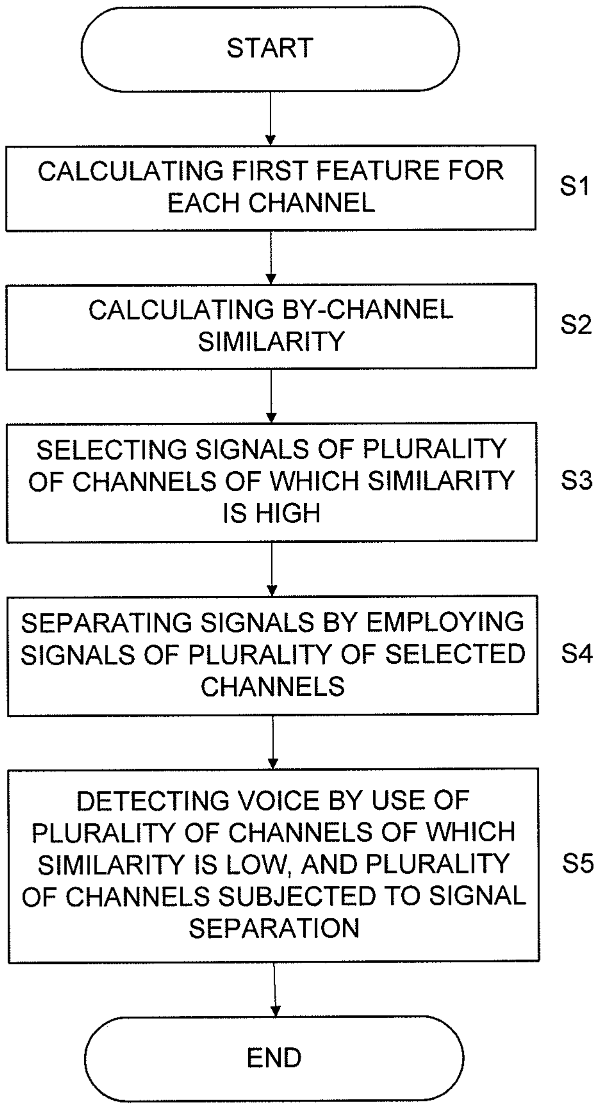
FIG. 4 is a flowchart illustrating an operation of the first exemplary embodiment of the present invention.

FIG. 4 is a flowchart illustrating a processing procedure in the multichannel acoustic signal processing system related to the first exemplary embodiment. The details of the multichannel acoustic signal processing system of the first exemplary embodiment will be explained below by making a reference to FIG. 3 and FIG. 4.

It is assumed that input signals 1 to M are x1($t$) to xM(t), respectively. Where, t is an index of time. The first feature calculators 1-1 to 1-M calculate the first features 1 to M from the input signals 1 to M, respectively (step S1).

$$F1(T) = [f11(T)f12(T)\ \dots\ f1L(T)] \tag{1-1}$$

$$F2(T) = [f21(T)f22(T)\ \dots\ f2L(T)] \tag{1-2}$$

$$\vdots$$

$$FM(T) = [fM1(T)fM2(T)\ \dots\ fML(T)] \tag{1-M}$$

Where, F1(T) to FM(T) are the features 1 to M calculated from the input signals 1 to M, respectively. T is an index of time, and it is assumed that a plurality of t is one section, and T may be used as an index in its time section. As shown in numerical equations (1-1) to (1-M), each of the first features F1(T) to FM(T) is configured as a vector having an element of an L-dimensional feature (L is a value equal to or more than 1). As the element of the first feature, for example, a time waveform (input signal), a statistics quantity such as an averaged power, a frequency spectrum, a logarithmic spectrum of frequency, a cepstrum, a melcepstrum, a likelihood for a acoustic model, a confidence measure (including entropy) for the acoustic model, a phoneme/syllable recognition result, a voice section length, and the like are thinkable.

It can be assumed that not only the features to be directly obtained from the input signals 1 to M, as described above, but also the by-channel value for a certain criteria, being the acoustic model, are the first feature, respectively. Additionally, the above-mentioned features are only one example, and needless to say, the other features are also acceptable.

Next, the similarity calculator 2 receives the first features 1 to M, and calculates the inter-channel similarity (step S2).

The method of calculating the similarity differs dependent upon the element of the feature. A correlation value, as a rule, is suitable as an index expressive of the similarity. Further, a distance (difference) value becomes an index expressive of the fact that smaller the value, the higher the similarity. Further, with the case that the first feature is the phoneme/syllable recognition result, the method of calculating the similarity is a method of comparing character strings, and a DP matching etc. is utilized for calculating the above similarity in some cases. Additionally, the above-mentioned correlation value and distance value and the like are only one example, and needless to say, the similarity may be calculated with the indexes other than them. Further, the similarities of all combinations of all channels do not need to be calculated, and with a certain channel, out of M channels, taken as a reference, only the similarity for the above channel may be calculated. Further, with a plurality of times T taken as one section, the similarity in the above time section may be calculated. With the case that the voice section length is included in the feature, it is also possible to omit the processing subsequent it for the channel in which no voice section is detected.

The channel selector 3 receives the inter-channel similarity coming from the similarity calculator 2, and selects and groups the channels of which the similarity is high (step S3).

As a selection method, the method of clustering, for example, the method of grouping the channels of which the similarity is higher than a threshold as a result of comparing the similarity with the threshold, and the method of grouping the channels of which the similarity is relatively high are employed. At that moment, the channel that is selected for a plurality of the groups may exist.

Further, the channel that is not selected for any group may exist. The input signals of the channels having a low similarity are not grouped into the input signals of any channel in such a manner, and are outputted to the multichannel voice detector 5.

Additionally, the similarity calculator 2 and the channel selector 3 may perform the processing in such a manner that the channels to be selected are narrowed by repeating the processing for the different features such as the calculation of the similarity and the selection of the channel.

The signal separators 4-1 to 4-N perform the signal separation for each group selected by the channel selector 3 (step S4).

The technique founded upon an independent component analysis, the technique founded upon a mean square error minimization, and the like are employed for the signal separation. While it is expected that the output of each signal separator is low in the similarity, there is a possibility that the outputs of the different signal separators include the output having a high similarity. In that case, some of the outputs resembling each other may be discarded, namely, for example, when three outputs resembling each other exist, two of three outputs may be discarded.

The multichannel voice detector 5 detects the voice of each of a plurality of the talkers in the signals of a plurality of the channels by use of anyone of the channels with the output signals of the signal separators 4-1 to 4-N, and the signals, which have been determined to be low in the similarity by the channel selector 3 and have not been grouped, taken as the input, respectively (step S5).

Herein, it is assumed that the output signals of the signal separators 4-1 to 4-N, and the signals that have been determined to be low in the similarity by the channel selector 3, and have not been grouped (the signals that are not inputted into the signal separators 4-1 to 4-N, and are directly inputted into the multichannel voice detector 5 from the channel selector 3) are y1($t$) to yK(t). The multichannel voice detector 5 detects the voices of a plurality of the talkers in the signals of a plurality of the channels from the signals y1($t$) to yK(t) with anyone of the channels, respectively. For example, on the assumption that the different voices have been detected in the channels 1 to P, respectively, the signals of the above voice sections are expressed as follows.

$$y1(ts1-te1)$$
$$y2(ts2-te2)$$
$$y3(ts3-te3)$$
$$\vdots$$
$$yP(tsP-teP)$$

Figure 5:
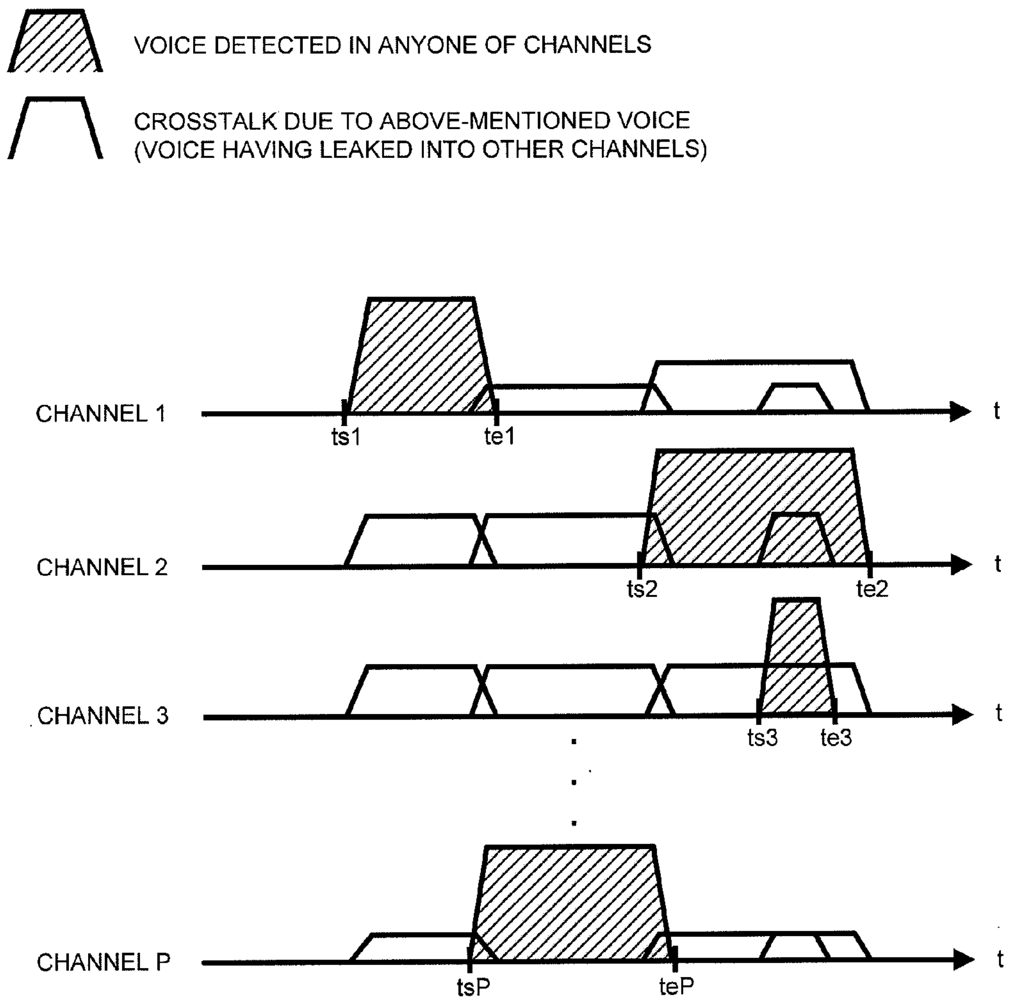
FIG. 5 is a view illustrating the crosstalk between the voice section to be detected by a multichannel voice detector 5 and the channel.

Where, ts1, ts2, ts3, . . . , and tsP are start times of the voice section detected in the channel 1 to P, respectively, and te1, te2, te3, . . . , and teP are end times of the voice section detected in the channel 1 to P, respectively (see FIG. 5). Additionally, the conventional technique of detecting the voice by employing a plurality of the signals is employed for the multichannel voice detector 5.

The first exemplary embodiment performs the signal separation in a small-scale unit based upon the inter-channel similarity without performing the signal separation for all channels, and further, does not input the channel requiring no signal separation into the signal separators 4-1 to 4-N. For this reason, the signal separation can be efficiently performed as compared with the case of performing the signal separation for all channels. And, performing the multichannel voice detection with the input signals of the channels having a low similarity (the signals that are not inputted into the signal separators 4-1 to 4-N, and are directly inputted into the multichannel voice detector 5 from the channel selector 3), and the signals subjected to the signal separation taken as the input makes it possible to efficiently detect the objective voice.

Second Exemplary Embodiment

The second exemplary embodiment of the present invention will be explained.

Figure 6:
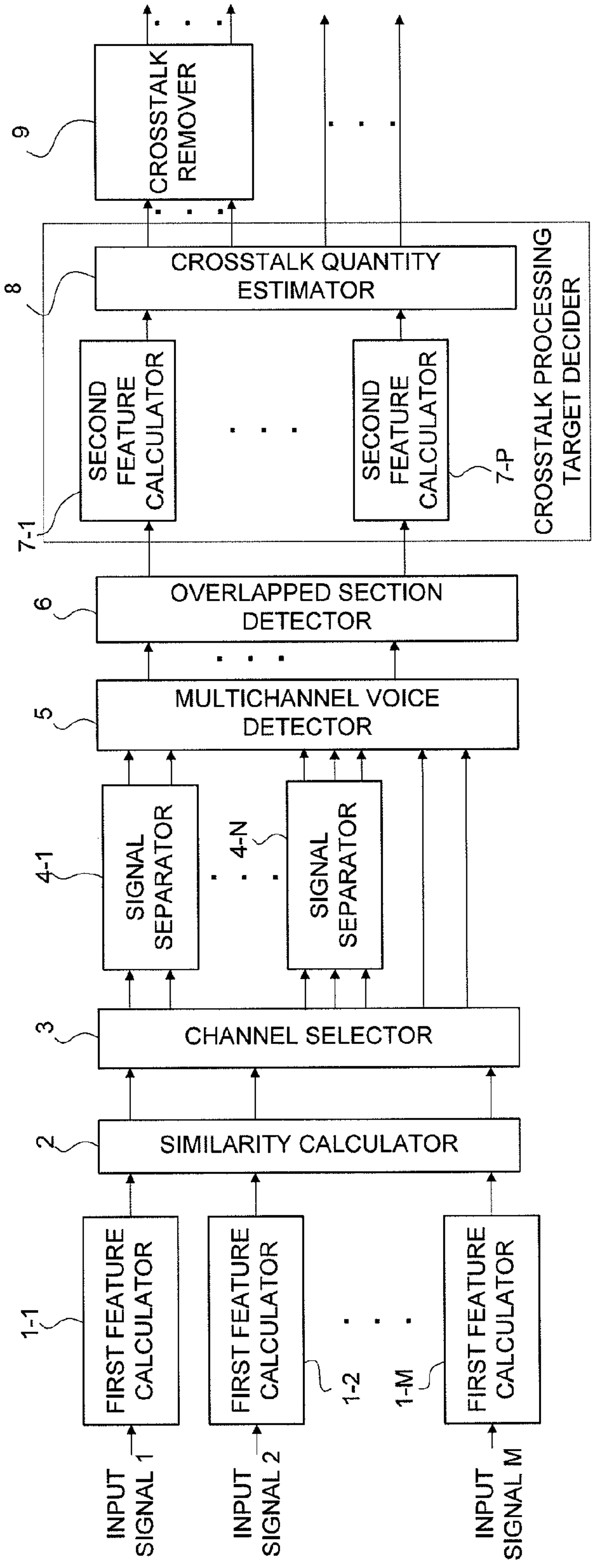
FIG. 6 is a block diagram illustrating a configuration of a second exemplary embodiment of the present invention.

FIG. 6 is a block diagram illustrating a configuration of the multichannel acoustic signal processing system of the second exemplary embodiment of the present invention. Upon comparing the second exemplary embodiment with the first exemplary embodiment shown in FIG. 3, an overlapped section detector 6 that detects the overlapped section of the voice sections of a plurality of the talkers detected by the multichannel voice detector 5, second feature calculators 7-1 to 7-P that calculate the second feature for each plural channels in which at least the voice has been detected, a crosstalk quantity estimator 8 that receives at least the second features of a plurality of the channel in the voice section that does not include the aforementioned overlapped section, and estimates magnitude of an influence of the crosstalk, and a crosstalk remover 9 that removes the crosstalk of which an influence is large are added to the rear stage of the multichannel voice detector 5 in the second exemplary embodiment.

Additionally, operations of the first feature calculators 1-1 to 1-M, the similarity calculator 2, the channel selector 3, the signal separators 4-1 to 4-N, and the multichannel voice detector 5 of the second exemplary embodiment are similar to those of the first exemplary embodiment, so only the overlapped section detector 6, the second feature calculators 7-1 to 7-P, the crosstalk quantity estimator 8, and the crosstalk remover 9 are explained in the following explanation.

Figure 7:
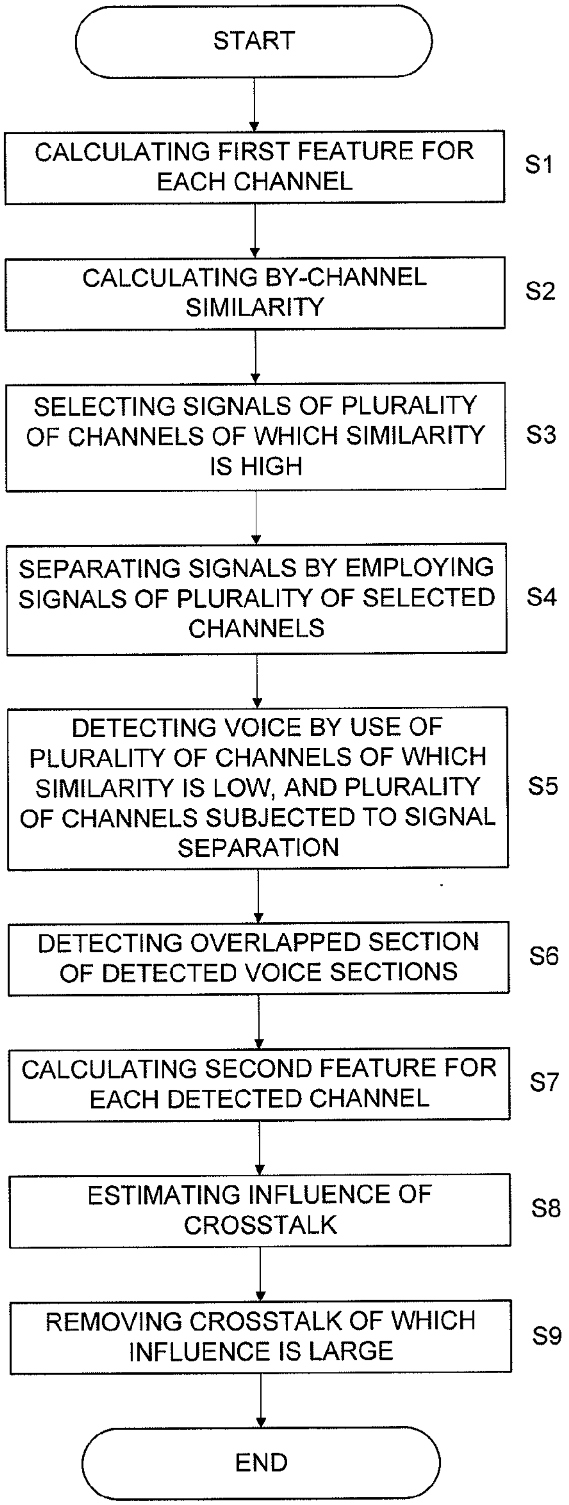
FIG. 7 is a flowchart illustrating an operation of the second exemplary embodiment of the present invention.

FIG. 7 is a flowchart illustrating a processing procedure in the multichannel acoustic signal processing system related to the second exemplary embodiment for carrying out the present invention. The details of the multichannel acoustic signal processing system of the second exemplary embodiment will be explained below by making a reference to FIG. 6 and FIG. 7.

The overlapped section detector 6 receives time information of the start edges and the end edges of the voice sections detected in the channels 1 to P, and detects the overlapped sections (step S6).

Figure 8:
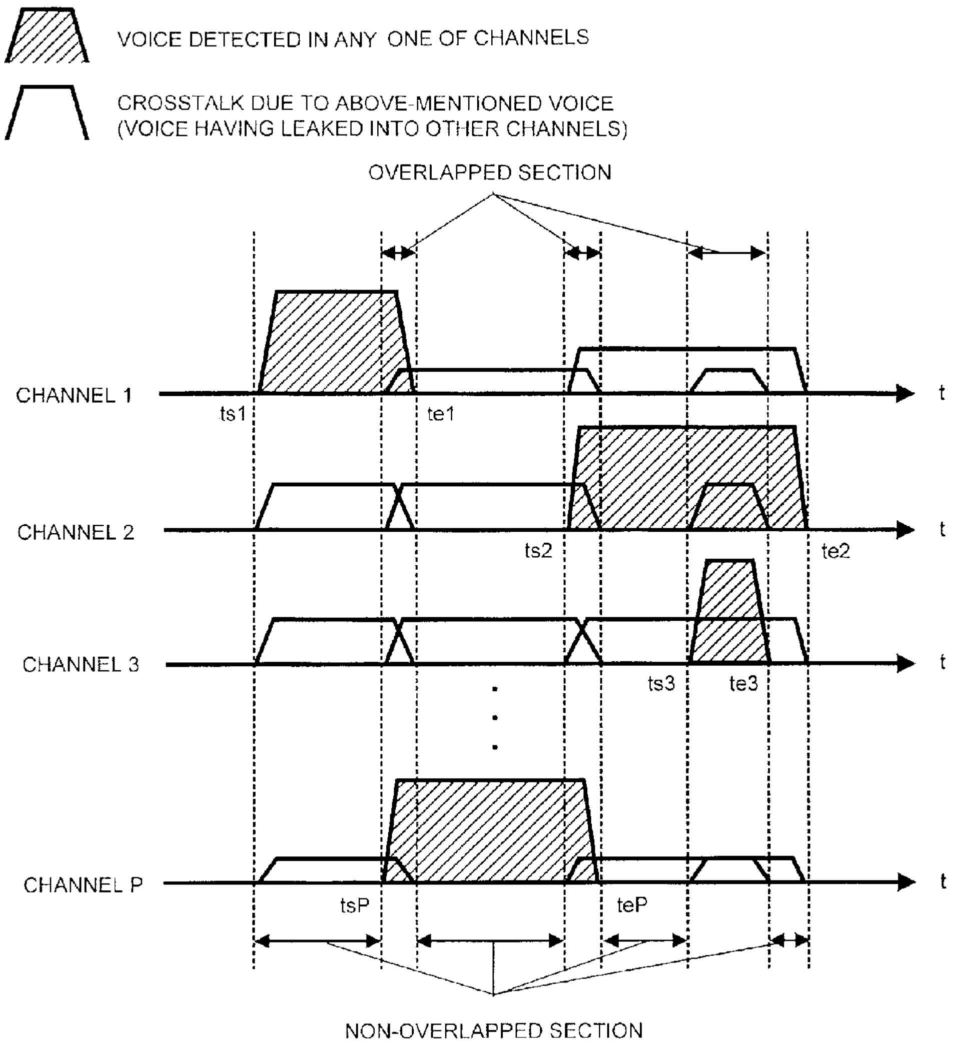
FIG. 8 is a view illustrating the overlapped section that is detected by an overlapped section detector 6.

The overlapped section, which is a section in which the detected voice sections are overlapped among the channels 1 to P, can be detected from a magnitude relation of ts1, ts2, ts3, . . . , tsP, and te1, te2, te3, . . . , teP as shown in FIG. 8. For example, the section in which the voice section detected in the channel 1 and the voice section detected in the channel P are overlapped is tsP to te1, and this section is the overlapped section. Further, the section in which the voice section detected in the channel 2 and the voice section detected in the channel P are overlapped is ts2 to teP, and this section is the overlapped section. Further, the section in which the voice sections detected in the channel 2 and the voice section detected in the channel 3 are overlapped is ts3 to te3, and this section is the overlapped section. The overlapped section, as described above, can be detected from a magnitude relation of ts1, ts2, ts3, . . . , tsP, and te1, te2, te3, . . . , teP.

Next, the second feature calculators 7-1 to 7-P calculate the second features 1 to P from signals y1(t) to yP(t), respectively (step S7).

$$G1(T) = [g11(T)g12(T) \ldots g1H(T)] \tag{2-1}$$

$$G2(T) = [g21(T)g22(T) \ldots g2H(T)] \tag{2-2}$$

$$\vdots$$

$$GP(T) = [gP1(T)gP2(T) \ldots gPH(T)] \tag{2-P}$$

Where, G1(T) to GP(T) are the second features 1 to P calculated from signals y1(t) to yP(t), respectively. As shown in numerical equations (2-1) to (2-P), each of the second features G1(T) to GP(T) is configured as a vector having an element of an H-dimensional feature (H is a value equal to or more than 1). As the element of the second feature, for example, a time waveform (input signal), a statistics quantity such as an averaged power, a frequency spectrum, a logarithmic spectrum of frequency, a cepstrum, a melcepstrum, a likelihood for a acoustic model, a confidence measure (including entropy) for the acoustic model, a phoneme/syllable recognition result, and the like are thinkable.

It can be assumed that not only the features to be directly obtained from the input signals 1 to P, as described above, but also the by-channel value for a certain criteria, being the acoustic model, are the second feature, respectively. Additionally, the above-mentioned features are only one example, and needless to say, the other features are also acceptable. Further, while all of the voice sections of a plurality of the channels in which at least the voice has been detected may be employed as the section in which the second feature is calculated, the feature can be desirably calculated in the following sections so as to reduce the calculation amount for calculating the second feature.

When the feature is calculated with the first channel, it is desirable to employ the following section of (1)+(2)−(3).

(1) The first voice section detected in the first channel.

(2) The n-th voice section of the n-th channel having the overlapped section common to the above first voice section.

(3) The overlapped section with the m-th voice section of the m-th channel other than the first voice section, out of the n-th voice section.

Figure 9:
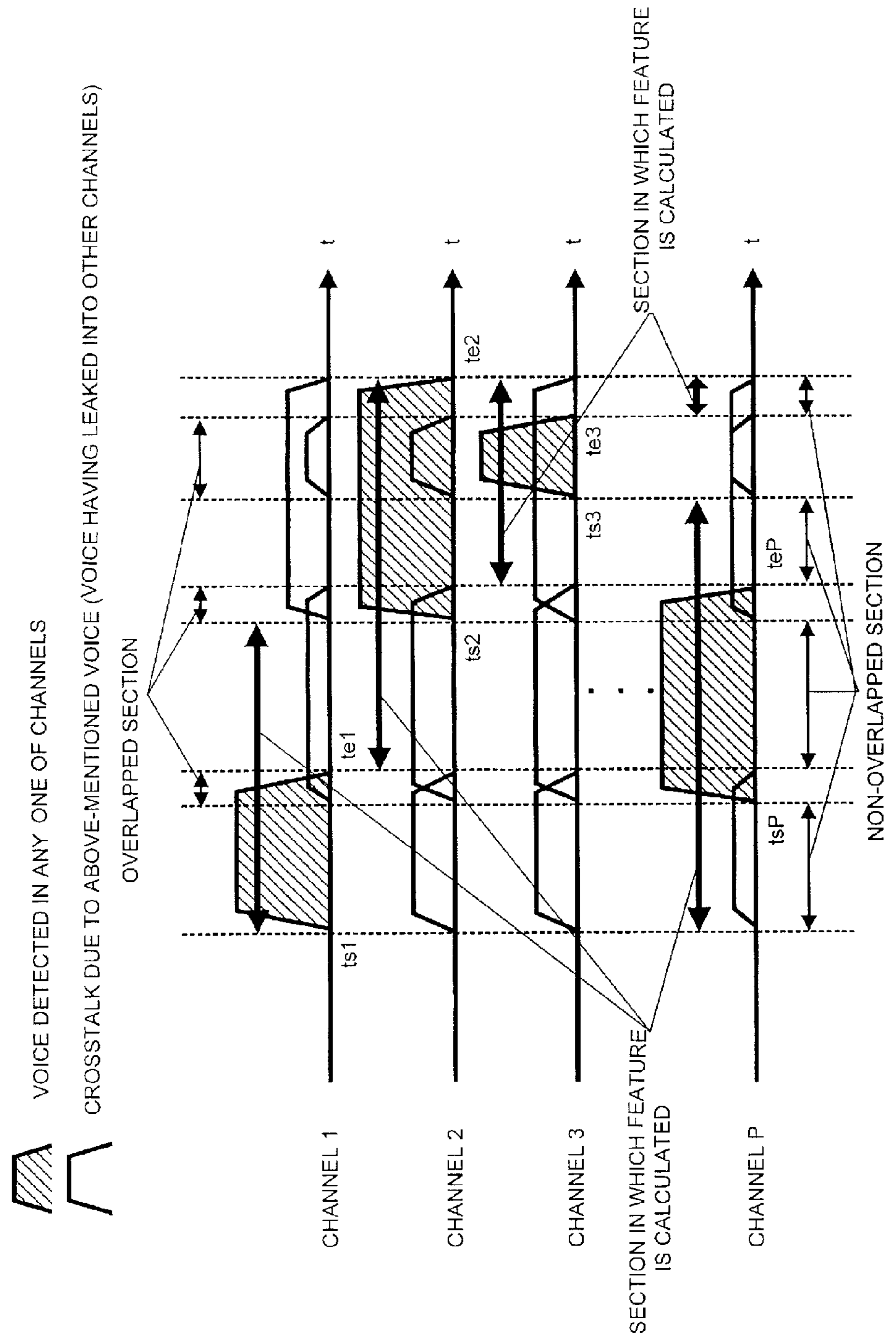
FIG. 9 is a view illustrating the section in which the feature is calculated by second feature calculators 7-1 to 7-P.
Figure 10:
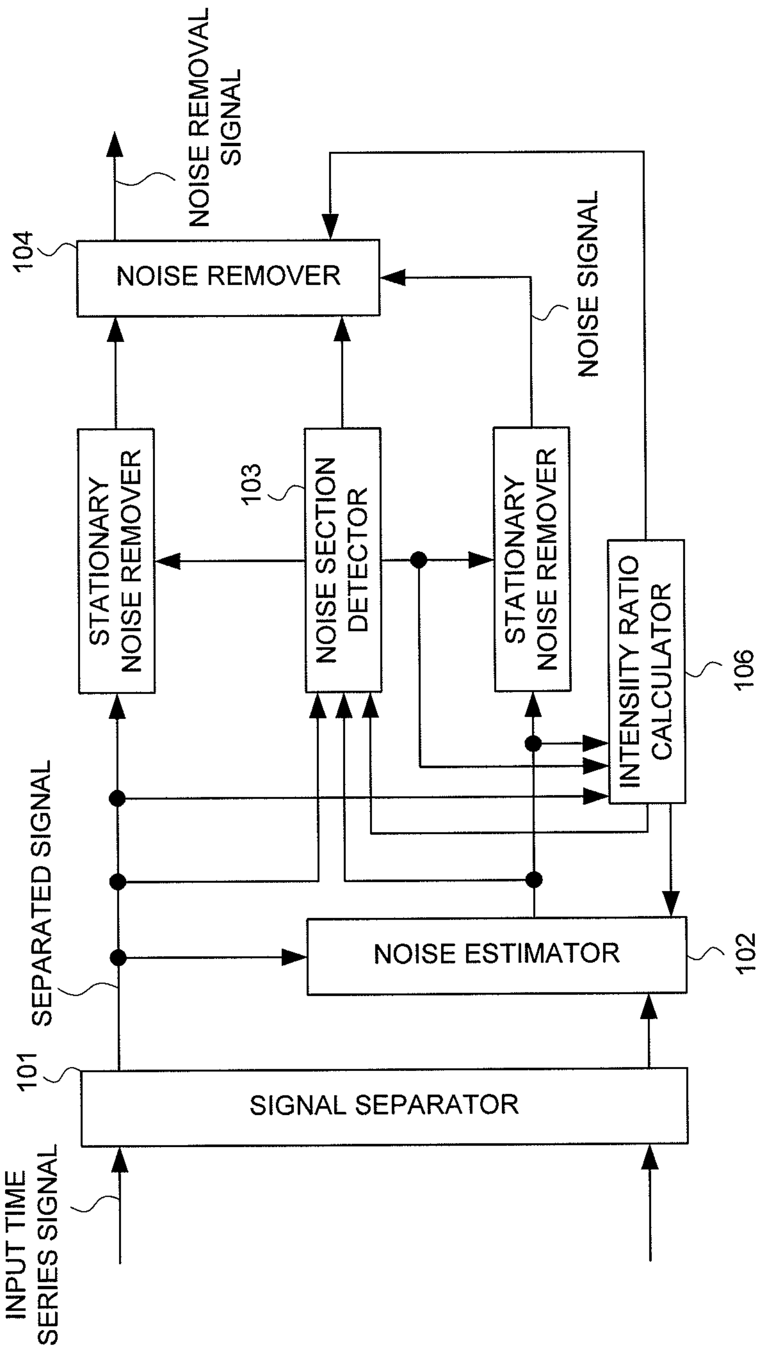
FIG. 10 is a block diagram illustrating a configuration of the related noise removal system.

The above-mentioned sections in which the second feature is calculated will be explained by making a reference to FIG. 9 as an example.

<When the Channel 1 is the First Channel>

(1) The voice section of the channel 1=(ts1 to te1).

(2) The voice section of the channel P having the overlapped section common to the voice section of the channel 1=(tsP to teP).

(3) The overlapped section with the voice section of the channel 2 other than the voice section of the channel 1, out of the voice section of the channel P,=(ts2 to teP)

The second feature of the section of (1)+(2)−(3)=(ts1 to ts2) is calculated.

<When the Channel 2 is the First Channel>

(1) The voice section of the channel 2=(ts2 to te2).

(2) The voice section of the channel 3 and the voice section of the channel P having the overlapped section common to the voice section of the channel 2=(ts3 to te3 and tsP to teP).

(3) The overlapped section with the voice section of the channel 1 other than the voice section of the channel 2, out of the voice section of the channel 3 and the voice section of the channel P,=(tsP to te1)

The second feature of the section of (1)+(2)−(3)=(te1 to te2) is calculated.

<When the Channel 3 is the First Channel>

(1) The voice section of the channel 3=(ts3 to te3).

(2) The voice section of the channel 2 having the overlapped section common to the voice section of the channel 3=(ts2 to te2).

(3) The overlapped section with the voice section of the channel P other than the voice section of the channel 3, out of the voice section of the channel 2,=(ts2 to teP)

The second feature of the section of (1)+(2)−(3)=(teP to te2) is calculated.

<When the Channel P is the First Channel>

(1) The voice section of the channel P=(tsP to teP).

(2) The voice section of the channel 1 and the voice section of the channel 2 having the overlapped section common to the voice section of the channel P=(ts1 to te1 and ts2 to te2).

(3) The overlapped section with the voice section of the channel 3 other than the voice section of the channel P, out of the voice section of the channel 1 and the voice section of the channel 2,=(ts3 to te3)

The second feature of the section of (1)+(2)−(3)=(ts1 to ts3 and te3 to te2) is calculated.

Additionally, when the calculation of the first feature and that of the second feature are overlapped, needless to say, the latter can be omitted.

Next, the crosstalk quantity estimator 8 estimates magnitude of an influence upon the first voice of the first channel that is exerted by the crosstalk due to the n-th voice of the n-th channel having the overlapped section common to the first voice of the first channel (step S8). The explanation is made with FIG. 9 exemplified. When it is assumed that the first channel is the channel 1, the crosstalk quantity estimator 8 estimates magnitude of an influence upon the voice of the channel 1 that is exerted by the crosstalk due to the voice of the channel P having the overlapped section common to the voice (the voice section is ts1 to te1) detected in the channel 1. As an estimation method, the following methods are thinkable.

<Estimation Method 1>

The estimation method 1 compares the feature of the channel 1 with that of the channel P in the section te1 to ts2, being the voice section that does not include the overlapped section. And, it estimates that an influence upon the channel 1 that is exerted by the voice of the channel P is large when the former is close to the latter.

For example, the estimation method 1 compares a power of the channel 1 with that of the channel P in the section te1 to ts2. And, it estimates that an influence upon the channel 1 that is exerted by the voice of the channel P is large when the former is close to the latter. Further, it estimates that an influence upon the channel 1 that is exerted by the voice of the channel P is small when the former is sufficiently larger than the latter.

<Estimation Method 2>

At first, the estimation method 2 calculates a difference of the feature between the channel 1 and the channel P in the section tsP to te1. Next, it calculates a difference of the feature between the channel 1 and the channel P in the section te1 to ts2, being the voice section that does not include the overlapped section. And, it compares the above-mentioned two differences, and estimates that an influence upon the channel 1 that is exerted by the voice of the channel P is large when a difference between the two differences of the features is small.

<Estimation Method 3>

The estimation method 3 calculates a power ratio of the channel 1 and the channel P in the section ts1 to tsP, being the voice section that does not include the overlapped section. Next, it calculates a power ratio of the channel 1 and the channel P in the section te1 to ts2, being the voice section that does not include the overlapped section. And, it employs the above-mentioned two power ratios, and the power of the channel 1 and the power of the channel P in the section tsP to te1, and calculates a power of the crosstalk due to the voice of the channel 1 and the voice of the channel P in the overlapped section tsP to te1 by solving a simultaneous equation. It estimates that an influence upon the channel 1 that is exerted by the voice of the channel P is large when the power of the voice of the channel 1 and the power of the crosstalk are close to each other.

As described above, the estimation method 3 employs at least the voice section that does not include the overlapped section, and estimates an influence of the crosstalk by use of a ratio based upon the inter-channel features, the correlation value, and the distance value.

Needless to say, the crosstalk quantity estimator 8 may estimate an influence of the crosstalk by employing the other methods. Additionally, it is difficult to estimate magnitude of an influence upon the channel 2 that is exerted by the crosstalk due to the voice of the channel 3 because the voice section of the channel 3 of FIG. 9 is contained in the voice section of the channel 2. When it is difficult to estimate magnitude of an influence in such a manner, a previously decided rule (for example, a rule etc. of determining that an influence is large) is obeyed.

The crosstalk remover 9 receives the input signals of a plurality of the channels each estimated as the channel that is largely influenced by the crosstalk, and the channel that exerts a large influence as the crosstalk in the crosstalk quantity estimator 8, and removes the crosstalk (step S9).

The technique founded upon an independent component analysis, the technique founded upon a mean square error minimization, and the like are appropriately employed for the removal of the crosstalk. Additionally, in some cases, the crosstalk remover 9 can appropriate a value of a signal separation filter used in the signal separators 4-1 to 4-N to an initial value of the filter for removing the crosstalk.

Further, with the section in which the crosstalk is removed, it is at least the overlapped section. For example, when the power of the channel 1 and that of the channel P in the section te1 to ts2 are compared with each other, and an influence upon the channel 1 that is exerted by the voice of the channel P is estimated to be large, it is assumed that the overlapped section (tsP to te1), out of the voice section (ts1 to te1) of the channel 1, is the section, being a target of the crosstalk processing due to the channel P, and the other sections are not the section, being a target of the crosstalk processing, and only the voice is removed. Doing so makes it possible to reduce the target of the crosstalk processing, and to alleviate a burden of the processing of the crosstalk.

The second exemplary embodiment of the present invention, in addition to the function of the first exemplary embodiment, detects the overlapped section of the voice sections of a plurality of the talkers, and decides the channel, being a target of the crosstalk removal processing, and the section thereof by employing at least the voice section that does not include the detected overlapped section. In particularly, the second exemplary embodiment estimates magnitude of an influence of the crosstalk by employing at least the features of a plurality of the channels in the aforementioned voice section that does not include the overlapped section, and removes the crosstalk of which an influence is large. This makes it possible to omit the calculation for removing the crosstalk of which an influence is small, and to efficiently remove the crosstalk.

Additionally, while in the above-mentioned exemplary embodiments, the explanation was made in such a manner that the section was a section for time, it may be assumed that the section is a section for frequency in some cases, and it may be assumed that the section is a section for time/frequency in some cases. For example, the so-called overlapped section in the case where the section is a section for time/frequency becomes the section in which the voice is overlapped at the identical time and frequency.

Further, while in the above-described exemplary embodiments, the first feature calculators 1-1 to 1-M, the similarity calculator 2, the channel selector 3, the signal separators 4-1 to 4-N, the multichannel voice detector 5, the overlapped section detector 6, the second feature calculators 7-1 to 7-P, the crosstalk quantity estimator 8, and the crosstalk remover 9 were configured with hardware, one part or an entirety thereof can be also configured with an information processing device that operates under a program.

Further, the content of the above-mentioned exemplary embodiments can be expressed as follows.

(Supplementary note 1) A multichannel acoustic signal processing method of processing input signals of a plurality of channels including voices of a plurality of talkers, comprising:

calculating a first feature for each channel from the input signals of a multichannel;

calculating an inter-channel similarity of said by-channel first feature;

selecting a plurality of the channels of which said similarity is high;

separating the signals by employing the input signals of a plurality of the selected channels; and detecting said by-talker voice section or said by-channel voice section with the input signals of a plurality of the channels of which said similarity is low and the signals subjected to said signal separation taken as an input, respectively.

(Supplementary note 2) A multichannel acoustic signal processing method according to Supplementary note 1, wherein said first feature to be calculated for each channel includes at least one of a time waveform, a statistics quantity, a frequency spectrum, a logarithmic spectrum of frequency, a cepstrum, a melcepstrum, a likelihood for an acoustic model, a confidence measure for an acoustic model, a phoneme recognition result, a syllable recognition result, and a voice section length.

(Supplementary note 3) A multichannel acoustic signal processing method according to Supplementary note 1 or Supplementary note 2, wherein an index expressive of said similarity includes at least one of a correlation value and a distance value.

(Supplementary note 4) A multichannel acoustic signal processing method according to one of Supplementary note 1 to Supplementary note 3, comprising repeating calculation of said by-channel similarity and selection of a plurality of the channels of which the similarity is high a plurality of number of times by employing the different features, and narrowing the channels that are selected.

(Supplementary note 5) A multichannel acoustic signal processing method according to one of Supplementary note 1 to Supplementary note 4, comprising detecting said by-talker voice section correspondingly to anyone of a plurality of the channels.

(Supplementary note 6) A multichannel acoustic signal processing method according to one of Supplementary note 1 to Supplementary note 5, comprising:

detecting an overlapped section, being a section in which said detected voice sections are overlapped between the channels;

deciding the channel, being a target of crosstalk removal processing, and the section thereof by employing at least the voice section that does not include said detected overlapped section; and removing crosstalk of the section of said channel decided as a target of the crosstalk removal processing.

(Supplementary note 7) A multichannel acoustic signal processing method according to Supplementary note 6, comprising:

estimating an influence of the crosstalk by employing at least the voice section that does not include said detected overlapped section; and assuming the channel of which an influence of the crosstalk is large, and the section thereof to be a target of the crosstalk removal processing, respectively.

(Supplementary note 8) A multichannel acoustic signal processing method according to Supplementary note 7, comprising determining an influence of the crosstalk by employing at least the input signal of each channel in the voice section that does not include said overlapped section, or a second feature that is calculated from the above input signal.

(Supplementary note 9) A multichannel acoustic signal processing method according to Supplementary note 8, comprising deciding the section in which said second feature is calculated by employing the voice section detected in an m-th channel, the voice section of an n-th channel having the overlapped section common to said voice section of the m-th channel, and the overlapped section with the voice sections of the channels other than the voice section of the m-th channel, out of said voice section of the n-th channel.

(Supplementary note 10) A multichannel acoustic signal processing method according to Supplementary note 8 or Supplementary note 9, wherein said second feature includes at least one of the statistics quantity, the time waveform, the frequency spectrum, the logarithmic spectrum of frequency, the cepstrum, the melcepstrum, the likelihood for the acoustic model, the confidence measure for the acoustic model, the phoneme recognition result, and the syllable recognition result.

(Supplementary note 11) A multichannel acoustic signal processing method according to one of Supplementary note 7 to Supplementary note 10, wherein an index expressive of said influence of the crosstalk includes at least one of a ratio, the correlation value and the distance value.

(Supplementary note 12) A multichannel acoustic signal processing system for processing input signals of a plurality of channels including voices of a plurality of talkers, comprising:

a first feature calculator that calculates a first feature for each channel from the input signals of a multichannel;

a similarity calculator that calculates an inter-channel similarity of said by-channel first feature;

a channel selector that selects a plurality of the channels of which said similarity is high;

a signal separator that separates the signals by employing the input signals of a plurality of the selected channels; and a voice detector that detects said by-talker voice section or said by-channel voice section with the input signals of a plurality of the channels of which said similarity is low and the signals subjected to said signal separation taken as an input, respectively.

(Supplementary note 13) A multichannel acoustic signal processing system according to Supplementary note 12, wherein said first feature calculator calculates at least one of a time waveform, a statistics quantity, a frequency spectrum, a logarithmic spectrum of frequency, a cepstrum, a melcepstrum, a likelihood for an acoustic model, a confidence measure for an acoustic model, a phoneme recognition result, a syllable recognition result, and a voice section length as the feature.

(Supplementary note 14) A multichannel acoustic signal processing system according to Supplementary note 12 or Supplementary note 13, wherein said similarity calculator calculates at least one of a correlation value and a distance value as an index expressive of said similarity.

(Supplementary note 15) A multichannel acoustic signal processing system according to one of Supplementary note 12 to Supplementary note 14:

wherein said first feature calculator calculates the by-channel different first features by use of different kinds of the features; and wherein said similarity calculator selects the channels a plurality number of times by employing the different first features, and narrows the channels that are selected.

(Supplementary note 16) A multichannel acoustic signal processing system according to one of Supplementary note 12 to Supplementary note 15, wherein said voice detector detects said by-talker voice section correspondingly to anyone of a plurality of the channels.

(Supplementary note 17) A multichannel acoustic signal processing system according to one of Supplementary note 12 to Supplementary note 16, comprising:

an overlapped section detector that detects an overlapped section, being a section in which said detected voice sections are overlapped between the channels;

a crosstalk processing target decider that decides the channel, being a target of crosstalk removal processing, and the section thereof by employing at least the voice section that does not include said detected overlapped section; and a crosstalk remover that removes crosstalk of the section of said channel decided as a target of the crosstalk removal processing.

(Supplementary note 18) A multichannel acoustic signal processing system according to Supplementary note 17, wherein said crosstalk processing target decider estimates an influence of the crosstalk by employing at least the voice section that does not include said detected overlapped section, and assumes the channel of which an influence of the crosstalk is large, and the section thereof to be a target of the crosstalk removal processing, respectively.

(Supplementary note 19) A multichannel acoustic signal processing system according to Supplementary note 18, wherein said crosstalk processing target decider determines an influence of the crosstalk by employing at least the input signal of each channel in the voice section that does not include said overlapped section, or a second feature that is calculated from the above input signal.

(Supplementary note 20) A multichannel acoustic signal processing system according to Supplementary note 19, wherein said crosstalk processing target decider decides the section in which said second feature is calculated for each said channel by employing the voice section detected in an m-th channel, the voice section of an n-th channel having the overlapped section common to said voice section of the m-th channel, and the overlapped section with the voice sections of the channels other than the voice section of the m-th channel, out of said voice section of the n-th channel.

(Supplementary note 21) A multichannel acoustic signal processing system according to Supplementary note 19 or Supplementary note 20, wherein said second feature includes at least one of the statistics quantity, the time waveform, the frequency spectrum, the logarithmic spectrum of frequency, the cepstrum, the melcepstrum, the likelihood for the acoustic model, the confidence measure for the acoustic model, the phoneme recognition result, and the syllable recognition result.

(Supplementary note 22) A multichannel acoustic signal processing system according to one of Supplementary note 18 to Supplementary note 21, wherein an index expressive of said influence of the crosstalk includes at least one of a ratio, the correlation value and the distance value.

(Supplementary note 23) A program for processing input signals of a plurality of channels including voices of a plurality of talkers, said program causing an information processing device to execute:

a first feature calculating process of calculating a first feature for each channel from the input signals of a multichannel;

a similarity calculating process of calculating an inter-channel similarity of said by-channel first feature;

a channel selecting process of selecting a plurality of the channels of which said similarity is high;

a signal separating process of separating the signals by employing the input signals of a plurality of the selected channels; and a voice detecting process of detecting said by-talker voice section or said by-channel voice section with the input signals of a plurality of the channels of which said similarity is low and the signals subjected to said signal separation taken as an input, respectively.

(Supplementary note 24) A program according to Supplementary note 23, wherein said first feature calculating process calculates at least one of a time waveform, a statistics quantity, a frequency spectrum, a logarithmic spectrum of frequency, a cepstrum, a melcepstrum, a likelihood for an acoustic model, a confidence measure for an acoustic model, a phoneme recognition result, a syllable recognition result, and a voice section length as the feature.

(Supplementary note 25) A program according to Supplementary note 23 or Supplementary note 24, wherein said similarity calculating process calculates at least one of a correlation value and a distance value as an index expressive of said similarity.

(Supplementary note 26) A program according to one of Supplementary note 23 to Supplementary note 25:

wherein said first feature calculating process calculates the by-channel different first features by use of different kinds of the features; and wherein said similarity calculating process selects the channels a plurality number of times by employing the different first features, and narrows the channels that are selected.

(Supplementary note 27) A program according to one of Supplementary note 23 to Supplementary note 26, wherein said voice detecting process detects said by-talker voice section correspondingly to anyone of a plurality of the channels.

(Supplementary note 28) A program according to one of Supplementary note 23 to Supplementary note 27, comprising:

an overlapped section detecting process of detecting an overlapped section, being a section in which said detected voice sections are overlapped between the channels;

a crosstalk processing target deciding process of deciding the channel, being a target of crosstalk removal processing, and the section thereof by employing at least the voice section that does not include said detected overlapped section; and a crosstalk removing process of removing crosstalk of the section of said channel decided as a target of the crosstalk removal processing.

(Supplementary note 29) A program according to Supplementary note 28, wherein said crosstalk processing target deciding process estimates an influence of the crosstalk by employing at least the voice section that does not include said detected overlapped section, and assumes the channel of which an influence of the crosstalk is large, and the section thereof to be a target of the crosstalk removal processing, respectively.

(Supplementary note 30) A program according to Supplementary note 29, wherein said crosstalk processing target deciding process determines an influence of the crosstalk by employing at least the input signal of each channel in the voice section that does not include said overlapped section, or a second feature that is calculated from the above input signal.

(Supplementary note 31) A program according to Supplementary note 30, wherein said crosstalk processing target deciding process decides the section in which said second feature is calculated for each said channel by employing the voice section detected in an m-th channel, the voice section of an n-th channel having the overlapped section common to said voice section of the m-th channel, and the overlapped section with the voice sections of the channels other than the voice section of the m-th channel, out of said voice section of the n-th channel.

(Supplementary note 32) A program according to Supplementary note 30 or Supplementary note 31, wherein said second feature includes at least one of the statistics quantity, the time waveform, the frequency spectrum, the logarithmic spectrum of frequency, the cepstrum, the melcepstrum, the likelihood for the acoustic model, the confidence measure for the acoustic model, the phoneme recognition result, and the syllable recognition result.

(Supplementary note 33) A program according to one of Supplementary note 29 to Supplementary note 32, wherein an index expressive of said influence of the crosstalk includes at least one of a ratio, the correlation value and the distance value.

Above, although the present invention has been particularly described with reference to the preferred embodiments, it should be readily apparent to those of ordinary skill in the art that the present invention is not always limited to the above-mentioned embodiment, and changes and modifications in the form and details may be made without departing from the spirit and scope of the invention.

This application is based upon and claims the benefit of priority from Japanese patent application No. 2009-031109, filed on Feb. 13, 2009, the disclosure of which is incorporated herein in its entirety by reference.

INDUSTRIAL APPLICABILITY

The present invention may be applied to applications such as a multichannel acoustic signal processing apparatus for separating the mixed acoustic signals of voices and noise of a plurality of talkers observed by a plurality of microphones arbitrarily arranged, and a program for causing a computer to realize a multichannel acoustic signal processing apparatus.

REFERENCE SIGNS LIST

1-1 to 1-M first feature calculators
2 similarity calculator
3 channel selector
4-1 to 4-N signal separators
5 multichannel voice detector
6 overlapped section detector
7-1 to 7-P second feature calculators
8 crosstalk quantity estimator
9 crosstalk remover

The invention claimed is:

1. A multichannel acoustic signal processing method of processing input signals of a plurality of channels including voices of a plurality of talkers, comprising:
- calculating, by at least one processor, a first feature for each channel from the input signals of a multichannel;
- calculating, by at least one processor, an inter-channel similarity of said by-channel first feature;
- grouping by at least one processor, a plurality of the channels of which said similarity is higher than a threshold;
- separating, by at least one processor, the signals for each group for input signals of the grouped channels; and
- detecting, by at least one processor, voice section of each said talkers or voice section of said each of the channels using the input signals of channels unsubjected to the grouping and the signals subjected to said signal separation, respectively.

2. A multichannel acoustic signal processing method according to claim 1, wherein said first feature to be calculated for each channel includes at least one of a time waveform, a statistics quantity, a frequency spectrum, a logarithmic spectrum of frequency, a cepstrum, a melcepstrum, a likelihood for an acoustic model, a confidence measure for an acoustic model, a phoneme recognition result, a syllable recognition result, and a voice section length.

3. A multichannel acoustic signal processing method according to claim 1, wherein an index expressive of said similarity includes at least one of a correlation value and a distance value.

4. A multichannel acoustic signal processing method according to claim 1, comprising repeating calculation of said by-channel similarity and selection of a plurality of the channels of which the similarity is higher than a threshold a plurality of number of times by employing the different features, and narrowing the channels that are selected.

5. A multichannel acoustic signal processing method according to claim 1, comprising detecting, by at least one processor, voice section of each said talkers correspondingly to anyone of a plurality of the channels.

6. A multichannel acoustic signal processing method according to claim 1, comprising:
- detecting an overlapped section, being a section in which said detected voice sections are overlapped between the channels;
- deciding the channel, being a target of crosstalk removal processing, and the section thereof, by employing at least the voice section that does not include said detected overlapped section; and
- removing crosstalk of the section of said channel decided as a target of the crosstalk removal processing.

7. A multichannel acoustic signal processing method according to claim 6, comprising:
- estimating an influence of the crosstalk by employing at least the voice section that does not include said detected overlapped section; and
- assuming the channel of which an influence of the crosstalk is large, and the section thereof, to be a target of the crosstalk removal processing, respectively.

8. A multichannel acoustic signal processing method according to claim 7, comprising determining an influence of the crosstalk by employing at least the input signal of each channel in the voice section that does not include said overlapped section, or a second feature that is calculated from the above input signal.

9. A multichannel acoustic signal processing method according to claim 8, comprising deciding the section in which said second feature is calculated by employing the voice section detected in an m-th channel, the voice section of an n-th channel having the overlapped section common to said voice section of the m-th channel, and the overlapped section with the voice sections of the channels other than the voice section of the m-th channel, out of said voice section of the n-th channel.

10. A multichannel acoustic signal processing method according to claim 8, wherein said second feature includes at least one of the statistics quantity, the time waveform, the frequency spectrum, the logarithmic spectrum of frequency, the cepstrum, the melcepstrum, the likelihood for the acoustic model, the confidence measure for the acoustic model, the phoneme recognition result, and the syllable recognition result.

11. A multichannel acoustic signal processing method according to claim 7, wherein an index expressive of said influence of the crosstalk includes at least one of a ratio, the correlation value and the distance value.

12. A multichannel acoustic signal processing system for processing input signals of a plurality of channels including voices of a plurality of talkers, comprising:
- a first feature calculator, implemented by at least one processor, configured to calculate a first feature for each channel from the input signals of a multichannel;
- a similarity calculator configured to calculate an inter-channel similarity of said by-channel first feature;
- a channel selector configured to group a plurality of the channels of which said similarly is higher than a threshold;
- a signal separator configured to separate the signals for each group for input signals of the grouped channels; and
- a voice detector configured to detect voice section of each said talkers or voice section of said each of the channels using the input signals of channels unsubjected to the grouping and the signals subjected to said signal separation, respectively.

13. A multichannel acoustic signal processing system according to claim 12, wherein said first feature calculator calculates at least one of a time waveform, a statistics quantity, a frequency spectrum, a logarithmic spectrum of frequency, a cepstrum, a melcepstrum, a likelihood for an acoustic model, a confidence measure for an acoustic model, a phoneme recognition result, a syllable recognition result, and a voice section length as the feature.

14. A multichannel acoustic signal processing system according to claim 12, wherein said similarity calculator calculates at least one of a correlation value and a distance value as an index expressive of said similarity.

15. A multichannel acoustic signal processing system according to claim 12:

wherein said first feature calculator configured to calculate the by-channel different first features by use of different kinds of the features; and wherein said channel selector configured to select the channels a plurality number of times by employing the different first features, and narrows the channels that are selected.

16. A multichannel acoustic signal processing system according to claim 12, wherein said voice detector detects voice section of said each talker corresponding to anyone of a plurality of the channels.

17. A multichannel acoustic signal processing system according to claim 12, comprising:

an overlapped section detector that detects an overlapped section, being a section in which said detected voice sections are overlapped between the channels;

a crosstalk processing target decider that decides the channel, being a target of crosstalk removal processing, and the section thereof, by employing at least the voice section that does not include said detected overlapped section; and a crosstalk remover that removes crosstalk of the section of said channel decided as a target of the crosstalk removal processing.

18. A multichannel acoustic signal processing system according to claim 17, wherein said crosstalk processing target decider estimates an influence of the crosstalk by employing at least the voice section that does not include said detected overlapped section, and assumes the channel of which an influence of the crosstalk is large, and the section thereof, to be a target of the crosstalk removal processing, respectively.

19. A multichannel acoustic signal processing system according to claim 18, wherein said crosstalk processing target decider determines an influence of the crosstalk by employing at least the input signal of each channel in the voice section that does not include said overlapped section, or a second feature that is calculated from the above input signal.

20. A multichannel acoustic signal processing system according to claim 19, wherein said crosstalk processing target decider decides the section in which said second feature is calculated for each said channel by employing the voice section detected in an m-th channel, the voice section of an n-th channel having the overlapped section common to said voice section of the m-th channel, and the overlapped section with the voice sections of the channels other than the voice section of the m-th channel, out of said voice section of the n-th channel.

21. A multichannel acoustic signal processing system according to claim 19, wherein said second feature includes at least one of the statistics quantity, the time waveform, the frequency spectrum, the logarithmic spectrum of frequency, the cepstrum, the melcepstrum, the likelihood for the acoustic model, the confidence measure for the acoustic model, the phoneme recognition result, and the syllable recognition result.

22. A multichannel acoustic signal processing system according to claim 18, wherein an index expressive of said influence of the crosstalk includes at least one of a ratio, the correlation value and the distance value.

23. A non-transitory computer readable storage medium storing a program for processing input signals of a plurality of channels including voices of a plurality of talkers, said program causing an information processing device to execute:

a first feature calculating process of calculating a first feature for each channel from the input signals of a multichannel;

a similarity calculating process of calculating an interchannel similarity of said by-channel first feature;

a channel selecting process of grouping by at least one processor, a plurality of the channels of which said similarity is higher than a threshold;

a signal separating process of separating the signals for each group for input signals of the grouped channels; and a voice detecting process of detecting voice section of each said talkers or voice section of said each of the channels using the input signals of channels unsubjected to the grouping and the signals subjected to said signal separation, respectively.

24. A non-transitory computer readable storage medium storing a program according to claim 23, wherein said first feature calculating process calculates at least one of a time waveform, a statistics quantity, a frequency spectrum, a logarithmic spectrum of frequency, a cepstrum, a melcepstrum, a likelihood for an acoustic model, a reliability degree for an acoustic model, a phoneme recognition result, a syllable recognition result, and a voice section length as the feature.

25. A non-transitory computer readable storage medium storing a program according to claim 23, wherein said similarity calculating process calculates at least one of a correlation value and a distance value as an index expressive of said similarity.

26. A non-transitory computer readable storage medium storing a program according to claim 23:

wherein said first feature calculating process calculates the by-channel different first features by use of different kinds of the features; and wherein said similarity calculating process selects the channels a plurality number of times by employing the different first features, and narrows the channels that are selected.

27. A non-transitory computer readable storage medium storing a program according to claim 23, wherein said voice detecting process detects voice section of said each talker corresponding to anyone of a plurality of the channels.

28. A non-transitory computer readable storage medium storing a program according to claim 23, comprising:

an overlapped section detecting process of detecting an overlapped section, being a section in which said detected voice sections are overlapped between the channels;

a crosstalk processing target deciding process of deciding the channel, being a target of crosstalk removal processing, and the section thereof, by employing at least the voice section that does not include said detected overlapped section; and a crosstalk removing process of removing crosstalk of the section of said channel decided as a target of the crosstalk removal processing.

29. A non-transitory computer readable storage medium storing a program according to claim 28, wherein said crosstalk processing target deciding process estimates an influence of the crosstalk by employing at least the voice section that does not include said detected overlapped section, and assumes the channel of which an influence of the crosstalk is large, and the section thereof, to be a target of the crosstalk removal processing, respectively.

30. A non-transitory computer readable storage medium storing a program according to claim 29, wherein said crosstalk processing target deciding process determines an influence of the crosstalk by employing at least the input signal of each channel in the voice section that does not include said overlapped section, or a second feature that is calculated from the above input signal.

31. A non-transitory computer readable storage medium storing a program according to claim 30, wherein said crosstalk processing target deciding process decides the section in which said second feature is calculated for each said channel by employing the voice section detected in an m-th channel, the voice section of an n-th channel having the overlapped section common to said voice section of the m-th channel, and the overlapped section with the voice sections of the channels other than the voice section of the m-th channel, out of said voice section of the n-th channel.

32. A non-transitory computer readable storage medium storing a program according to claim 30, wherein said second feature includes at least one of the statistics quantity, the time waveform, the frequency spectrum, the logarithmic spectrum of frequency, the cepstrum, the melcepstrum, the likelihood for the acoustic model, the confidence measure for the acoustic model, the phoneme recognition result, and the syllable recognition result.

33. A non-transitory computer readable storage medium storing a program according to claim 29, wherein an index expressive of said influence of the crosstalk includes at least one of a ratio, the correlation value and the distance value.

* * * * *

UNITED STATES PATENT AND TRADEMARK OFFICE

CERTIFICATE OF CORRECTION

PATENT NO. : 8,954,323 B2
APPLICATION NO. : 13/201389
DATED : February 10, 2015
INVENTOR(S) : Tsujikawa et al.

It is certified that error appears in the above-identified patent and that said Letters Patent is hereby corrected as shown below:

On the title page item [56], Column 2, Foreign Patent Documents: Delete “2006-5100869” and insert -- 2006-510069 --

On the title page item [56], Page 2, Column 1, Foreign Patent Documents: Delete “2008-0892363” and insert -- 2008-082363 --

Signed and Sealed this
Twenty-ninth Day of December, 2015

Michelle K. Lee

Michelle K. Lee
*Director of the United States Patent and Trademark Office*